United States Patent [19]

Hatano et al.

[11] Patent Number: 4,628,456
[45] Date of Patent: Dec. 9, 1986

[54] COURSE GUIDANCE SYSTEM

[75] Inventors: Itaru Hatano, Morioka; Kenji Takahashi, Iwate; Shigeru Hirosawa, Iwate; Mikio Kanda, Iwate; Teruo Mimori; Toshio Sasaki, both of Yokohama; Tadashi Mukai, Tokyo; Tsuneo Takahashi, Saitama; Shinichiro Yasui, Tokyo; Akira Ichikawa, Saitama, all of Japan

[73] Assignee: Alps Electric Co., Ltd., Japan

[21] Appl. No.: 405,767

[22] Filed: Aug. 6, 1982

[30] Foreign Application Priority Data

Aug. 7, 1981 [JP] Japan .................................. 56-123876

[51] Int. Cl.[4] .............................................. G06F 15/50
[52] U.S. Cl. .................................. 364/449; 364/521; 340/995; 340/727
[58] Field of Search ............... 364/424, 443, 444, 449, 364/521; 353/11, 12; 343/450–453; 73/178 R; 340/988–990, 992, 995, 996, 709, 711, 731, 727

[56] References Cited

U.S. PATENT DOCUMENTS

| | | | |
|---|---|---|---|
| 4,071,895 | 1/1978 | Wood et al. ........................ | 343/452 |
| 4,086,632 | 4/1978 | Lions ................................... | 364/521 |
| 4,139,889 | 2/1979 | Ingels ................................. | 364/460 |
| 4,312,577 | 1/1982 | Fitzgerald .......................... | 364/424 |
| 4,366,475 | 12/1982 | Kishi et al. ........................ | 340/711 |
| 4,400,780 | 8/1983 | Nagao et al. ....................... | 343/452 |
| 4,435,760 | 3/1984 | Kuno et al. ........................ | 364/444 |
| 4,504,913 | 3/1985 | Miura et al. ....................... | 364/449 |
| 4,527,155 | 7/1985 | Yamaki et al. ..................... | 340/995 |
| 4,543,572 | 9/1985 | Tanaka et al. ..................... | 340/995 |

FOREIGN PATENT DOCUMENTS 55-159299 12/1980 Japan .

*Primary Examiner*—Gary Chin
*Attorney, Agent, or Firm*—Guy W. Shoup

[57] ABSTRACT

In a course guidance system for use in an automobile, for example, which includes an electronic display, a map, a direction sensor, a speed sensor and the like for deriving the present location of the car and plotting it on the display, the invention provides a course guidance system for a car which causes a linear and/or rotational movement of the driving locus displayed on the display when the map is changed or reset so that the present position can be easily located on the map.

7 Claims, 7 Drawing Figures

Fig. 3 (A)
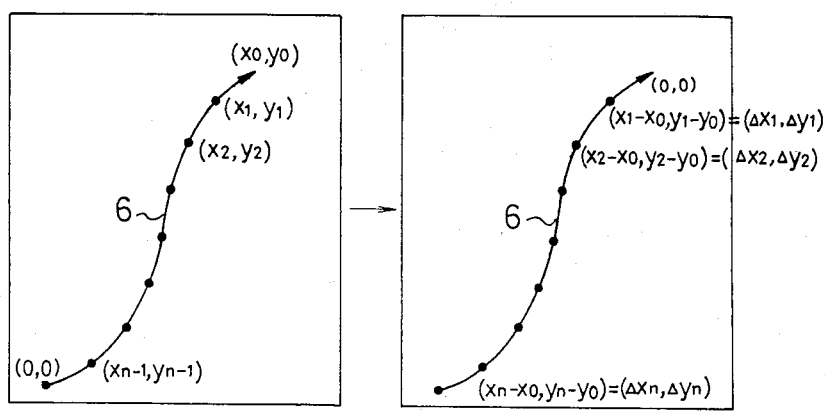
Fig. 3 (B)
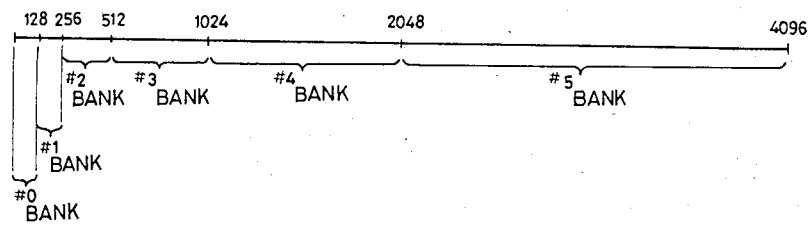
Fig. 3 (C)
| BANK \ sampling mode | 1 | 2 | 4 | 8 | 16 | 32 |
|---|---|---|---|---|---|---|
| #0 BANK | 128 / 1 | 64 / 2 | 32 / 4 | 16 / 8 | 8 / 16 | 4 / 32 |
| #1 BANK |  | 64 / 1 | 32 / 2 | 16 / 4 | 8 / 8 | 4 / 16 |
| #2 BANK |  |  | 64 / 1 | 32 / 2 | 16 / 4 | 8 / 8 |
| #3 BANK |  |  |  | 64 / 1 | 32 / 2 | 16 / 4 |
| #4 BANK |  |  |  |  | 64 / 1 | 32 / 2 |
| #5 BANK |  |  |  |  |  | 64 / 1 |

COURSE GUIDANCE SYSTEM

BACKGROUND OF THE INVENTION

This invention relates to a course guidance system having the function of moving the display position of the locus. In a course guidance system which includes an electronic display disposed, for example, at the driver's seat of a car, a map adapted to the display surface of the display and a direction sensor and a speed sensor mounted in the car for deriving the location of the car and plotting it on the display, thereby guiding the driving course while keeping the car's location associated with the map, the present invention is particularly concerned with a course guidance system for a car which linearly moves or rotates of the entire driving locus displayed on the display when the map is reset, for example, in order to easily locate the car's location on the map.

Micro-computers have become much more available in recent years and driving navigation systems for cars have been developed. Among these navigation systems, there has been developed a course guidance system which includes a direction sensor and a speed sensor that are mounted in the car for deriving the location of the car and plotting it on a map, so that the road map corresponds to the display and the plotted dots extend along the road on the map.

In adopting this system, it is an essential condition that the displayed locus correctly corresponds to the map. To ensure correct correspondence, it is desirable that when the map is reset, for example, the locus on the display can be easily located with respect to the route driven by linearly and/or rotationally moving the locus.

The present invention is directed to provide a course guidance system for a car which satisfies this requirement. The object and features of the present invention will become more apparent from the following description to be taken in conjunction with the accompanying drawings.

BRIEF DESCRIPTION OF THE DRAWINGS

FIGS. 3(A)-3(C) are diagrams useful for explaining the storage mode of position data to be stored in the locus memory of FIG. 2 and the reading mode of the position data;

DESCRIPTION OF THE PREFERRED EMBODIMENTS

Figure 1:
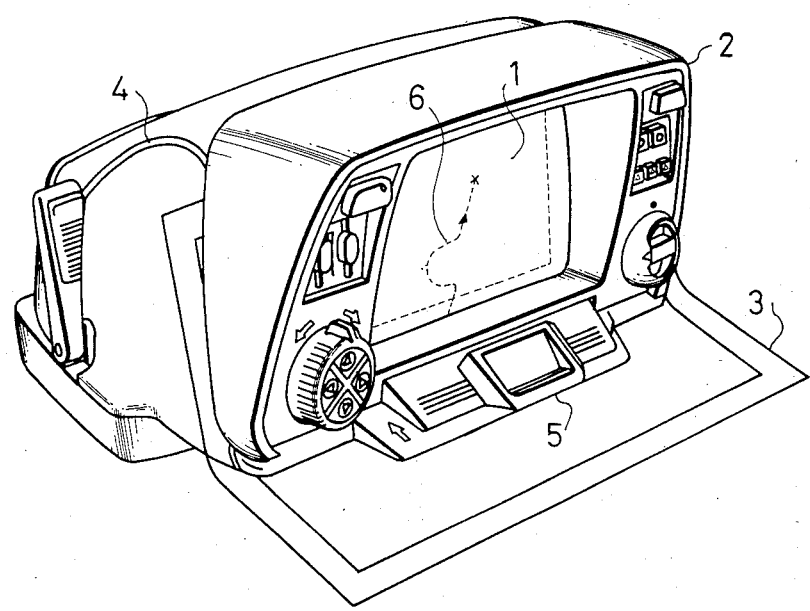
FIG. 1 is a perspective view of the course guidance system as a whole in accordance with an embodiment of the present invention.

Referring to FIG 1, reference numeral 1 represents the display surface of a CRT display; 2 is a display housing; 3 is a map printed on a transparent film, for example; 4 is a map insertion guide groove; 5 is a map fixing member; and 6 is a driving locus.

As will be described in detail elsewhere with reference to FIG. 2, a direction sensor and a speed sensor are mounted in the car so that the individual driving positions from a reference starting point are derived and the driving locus 6 is plotted on the display surface 1 of the CRT display. On the other hand, the map 3 printed on the transparent film is inserted from the foreground of the drawing along the map insertion guide groove 4 until it is positioned on the front of the display surface 1. The map is then fixed by the map fixing member 5. Needless to say, the locus 6 is plotted so as to match the reduced scale of the map. The driving orbit 6 sequentially appears along a desired driving route on the map so that the driver or the passenger can see the car's present location from the correspondence of the driving locus 6 on the map in order to determine the driving direction, the present location, and the like.

Figure 2:
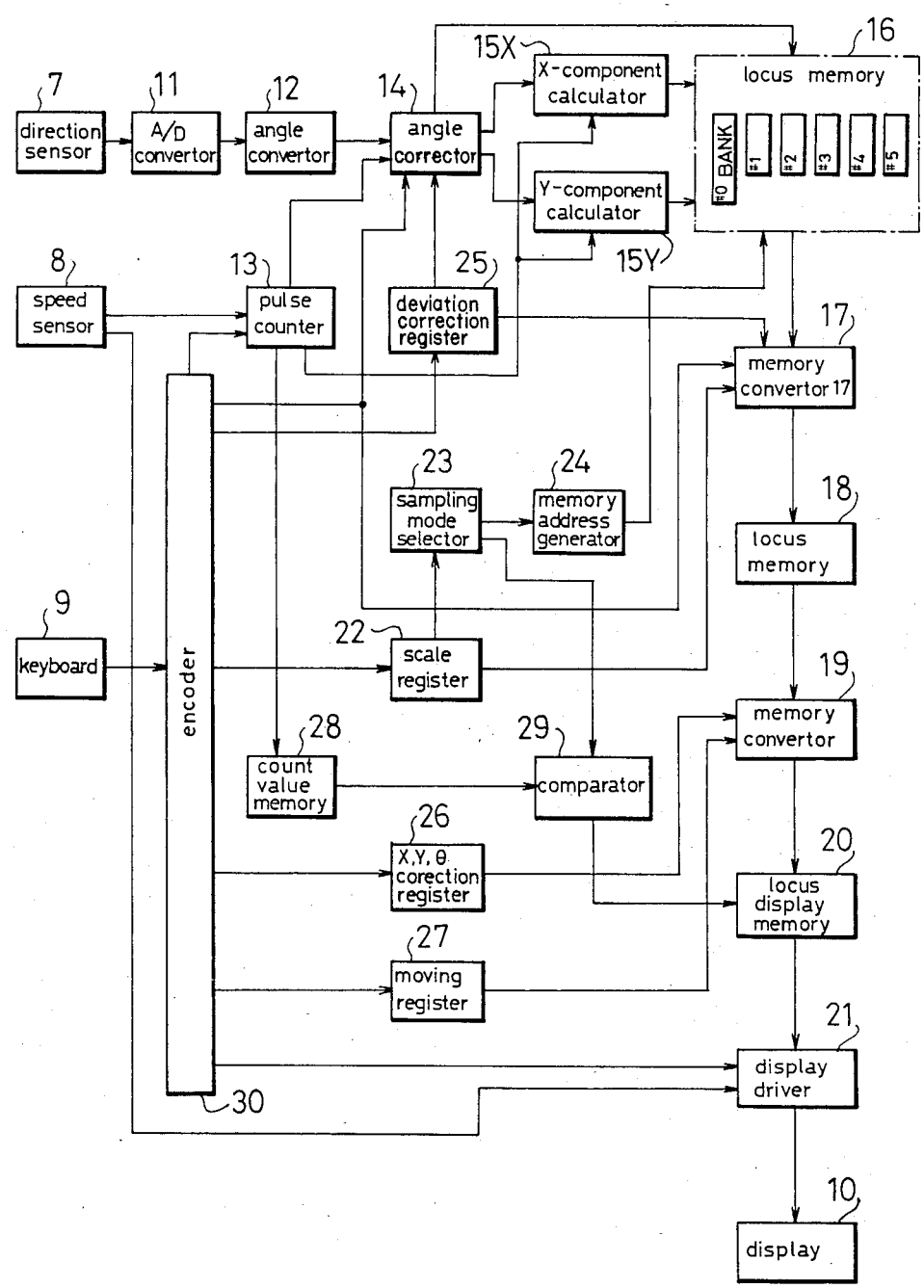
FIG. 2 is a block diagram of the embodiment of the present invention.

FIG. 2 is a block diagram showing the construction of an embodiment of the present invention as a whole. Reference numeral 7 represents the abovementioned direction sensor which detects the direction the car is driving with reference to a given reference direction. Reference numeral 8 represents the speed sensor which generates clock pulses corresponding to the number of revolutions of the wheels, for example. Reference numeral 9 represents a keyboard including a variety of keys disposed on the front surface of the display housing shown in FIG. 1 and on the side surface of the display main body, the latter not being shown in the drawing. Reference numeral 10 represents the display.

The direction data from the direction sensor 7 is converted into digital signals by an A/D convertor 11 and into angle data by an angle-data convertor 12. On the other hand, the clock pulses from the speed sensor 8 are counted by a pulse counter 13 and generate a sample clock signal every 10 revolutions of the wheel. Whenever the sample clock signal is generated, the angle data is supplied to an X component calculator 15X and to a Y component calculator 15Y via a data correction circuit 14. The X component calculator 15X derives the change along the X axis in the reference direction (north), for example, adds it to the accumulated value of the movements on the X axis up to that moment, calculates the coordinates of the present position on the X axis, and supplies the calculated result to the locus memory 16, which stores the value in the #0 bank. Similarly, the Y component calculator 15Y derives the change along the Y axis, adds it to the accumulated value of movements along the Y axis up to that moment, calculates the coordinates of the present position on the Y axis and supplies it to the locus memory 16 which stores the value in the #0 bank. If the coordinates of the starting point are (0, 0), for example, the coordinate value of the present position is calculated on the basis of the former and is supplied to the locus memory 16.

The contents of locus memory 16 is read out to be subjected to a predetermined conversion in a convertor 17 and is thereafter stored in locus memory 18. In this case, conversion is effected corresponding to the reduced scale of the map, which will be described later with reference to FIG. 3. The contents of memory 18 is read out to be subjected to a second predetermined conversion, such as to effect linear displacement of the locus on the display, in a memory convertor 19, and is thereafter stored in the locus display memory 20. The contents of the memory 20, corresponding to the image figure to be displayed by the display 10, is read out via a driver 21, and supplied to the display 10, thereby providing the driving locus 6 such as shown in FIG. 1. The driving locus 6 is observed through the map printed on the transparent sheet shown in FIG. 1 and is brought into agreement with the desired road to perform the course guidance.

Reference numeral 22 represents a scale register to which scale data of the map set as shown in FIG. 1 is set through the keyboard 9. The contents of the register 22 is supplied to the memory convertor 17 and is used in transferring the contents of memory 16 in the proper scale to memory 18. The contents of the register 22 is applied to a sampling mode selector 23 and is used for forming the addressing of locus memory 16 by an address generator 24. This processing will be described later with reference to FIG. 3.

Reference numeral 25 represents a compensating angle correction register, to which a correction value for correcting the angle of the difference between the actual driving direction and that of the locus on the map is set by the keyboard 9. The angle is corrected in transferring the contents of memory 16 to memory 18 using the compensation value which is set so as to correct the angle deviation in an adjusting mode, such as when the unit shown in FIG. 1 is mounted in the car.

Reference numeral 26 represents an X, Y, $\theta$ correction register, to which the correction data are set via the keyboard 9 in order to correct slight deviations between the road on the map and the actual driving locus 6 under the state in which the map is set as shown in FIG. 1. The above-mentioned deviation is corrected in convertor 19 when the content of memory 18 is transferred to memory 20.

Reference numeral 27 represents a moving register for linearly and/or rotationally moving the driving locus 6 on the display 10 as a whole when the map 3 is set such as shown in FIG. 1 is replaced by a new map, or for effecting the linear or rotational movement in the convertor 19 when the moving data are set by the keyboard 9 and the contents of memory 18 is transferred to memory 20.

Reference numeral 28 represents a count value memory, to which the contents of the pulse counter 13 is set when the car passes for example a railroad crossing or a bridge. This memory is used to plot the passing position on the display 10 in a different display mode from that of the aforementioned driving locus 6. In other words, it leaves a memory mark having brighter dots on the driving locus 6 to locate it with respect to the map. Reference numeral 29 represents a comparator, which is used for writing the mark into memory 20 in response to the spot corresponding to the contents of memory 28. Reference numeral 30 represents an encoder 30 which generates code corresponding to the data input from the keyboard 9.

The driver 21 shown in FIG. 2 receives the suppress mode indication data from an encoder 30 and the driving data from the speed sensor 8, and suppresses the display on the display 10 during the driving of the car to avoid the driver of the car becoming distracted by the display during driving.

The principal processing in the aforementioned X component calculator 15X, Y component calculator 15Y, memory convertor 17 and locus memory 18 will be described in detail with reference to FIG. 3.

As described already, the X and Y component calculators 15X and 15Y calculate the coordinates of the location of the car (xi, yi) at a timing corresponding to the sample clock, with the coordinates of the starting point being, for example, (0, 0). The result of calculation is stored in locus memory 16. In conjunction with the driving locus 6, this mode may be regarded as one shown on the left of FIG. 3(A). In other words, the coordinates $(x_{n-1}, y_{n-1}), \ldots (x_2, y_2), (x_1, y_1), (x_0, y_0)$ from the coordinates of the starting point (0, 0) are stored in memory 16. Memory 16 has a #0 bank for 128 words and #1 through #5 banks for 64 words, for example. 128 coordinates starting from the coordinates $(x_0, y_0)$ shown in the drawing and ending with the coordinates $(x_{127}, y_{127})$ are sequentially stored in the #0 bank in a push-down memory register, for example. The coordinate data overflowing from the #0 bank are extracted every other data, for example, and are stored in the #1 bank in the push-down system. The coordinate date overflowing from the #1 bank are extracted every other data, for example, and are stored in the #2 bank. The same procedures are followed for the #3 through #5 banks.

In other words, as shown in FIG. 3(B), 64 coordinate data, one for every second sample clock, signal are stored in the #1 bank among the 129th coordinates to the 256th coordinates as viewed from the present point $(x_0, y_0)$. Similarly, 64 coordinate data, one for every four sample clocks signals, are stored in the #2 bank among the 257th to 512th coordinate data. Furthermore, one coordinate data is stored in the #3 bank for every eight sample clock signals, in the #4 bank for every 16 sample clock signals, and in the #5 bank for every 32 sample clock signals.

When the map is used in the abovementioned manner, the driving locus on the display 10 should be displayed in a form corresponding to the reduced scale of the map. In displaying the driving locus 6 corresponding to a map of the smallest reduced scale, therefore, the coordinate data on the #0 bank are sequentially sampled with the sampling mode "1" (or without sampling) as shown in FIG. 3(C), thereby forming a driving locus consisting of 128 dots. When a map having a scale of 2X is used, 64 coordinate data are read out from the #0 bank with the sampling mode "2" (sampling of every other datum) and 64 coordinate data are also read out from the #1 bank with the sampling mode "1", forming a driving locus consisting of a total of 128 dots. When a map having a reduction scale of about 32X is used, for example, every 32nd coordinate datum is read out from the #0 bank, every 16th datum from the #1 bank, every 8th datum from the #2 bank, every 4th datum from the #3 bank, every other datum from the #4 bank and all the data from the #5 bank, forming a driving locus consisting of a total of 128 dots.

In transferring the contents of locus memory 16 to locus memory 18, the reduced scale data are set to the scale register 22 corresponding to the abovementioned scale reduction ratio and the corresponding sampling mode is determined, forming the corresponding memory addresses. The locus memory 16 is accessed based on the addresses. In the interim, correction based on the compensating angle correction register 25 is effected. However, in extracting the 128 dots from the contents of memory 16 and storing them in locus memory 18, the convertor 17 effects conversion in such a manner that a preceding coordinate position $(x_i, y_i)$ with the present coordinate position being the position $(x_0, y_0)$ becomes $(x_1-x_0, y_1-y_0)$, the coordinate position before the preceding position becomes $(x_2-x_0, y_2-y_0)$, and so forth. After conversion is made in this manner, the convertor 17 transfers the data to memory 18. This procedure makes it possible to process the display on the display 10 based on the present position as the reference and also makes it easy to carry out various adjustments.

The course guidance system for automobiles, to which an embodiment of the present invention is directed, has the construction and function substantially described above. When the map is reset, such as in replacement, great deviation is likely to occur between the displayed position of the driving locus, which is generally in the display mode, and the position on the map. In this case, the deviation can be corrected by manually positioning the map, which is set such as shown in FIG. 1, to the driving locus. It is preferable that this positioning be done by simply moving the driving locus 6.

To do this, in the embodiment of the present invention, the amount or distance to be moved is set to the moving register 27 and the driving locus 6 is moved.

In other words, in transferring the position data in locus memory 18 shown in FIG. 2 (data such as shown on the right of FIG. 3(a)) to the locus display memory 20, the following coordinate conversion is conducted in the convertor 9 shown in FIG. 2:

$$\left. \begin{array}{l} DSP\Delta xi = (\Delta xi) \times (CNDNSX) \\ DSP\Delta yi = (\Delta yi) \times (CNDNSY) \end{array} \right\} \quad (1)$$

where $DSP\Delta xi$ and $DSP\Delta yi$ are the coordinates in the locus display memory 20, respectively, and CNDNSX and CNDNSY are coefficients for making $\Delta xi$ and $\Delta yi$ correspond to the displayed coordinates.

In the embodiment of the present invention, the following coordinate conversion is effected using the coordinates conversion processing of the above equation (1):

$$\left. \begin{array}{l} DSP\Delta xi = (\Delta x_E + \Delta xi) \times (CNDNSX) \\ DSP\Delta yi = (\Delta y_E + \Delta yi) \times (CNDNSY) \end{array} \right\} \quad (2)$$

where $\Delta x_E$ and $\Delta y_E$ represent the amount of linear motion.

In other words, setting the memory 20 is made in such a manner that $\Delta x_E$ offsets $\Delta xi$ and $\Delta y_E$ offsets $\Delta yi$.

If the set time for the indication of movement is greater than a predetermined period of time in the actual movement, the moving pitch is changed, as will be described later with reference to FIGS. 4 and 5. In the rough adjustment, $\Delta x_E$ an $\Delta y_E$ in the abovementioned equation (2) are changed in the following manner:

$$\left. \begin{array}{l} \Delta x_E = \Delta x_{E'} + 10 \times (SHFTCX) \\ \Delta y_E = \Delta y_{E'} + 10 \times (SHFTCY) \end{array} \right\} \quad (3)$$

where $\Delta x_E'$ and $\Delta y_E'$ are the amount of movement in the previous pitch and SHFTCX and SHFTCY are a unit movement.

In other words, the amount of the unit movement is increased.

In fine adjustment, $\Delta x_E$ and $\Delta y_E$ in equation (2) are changed in the following way:

$$\left. \begin{array}{l} \Delta x_E = \Delta x_{E'} + (SHFTCX) \\ \Delta y_E = \Delta y_{E'} + (SHFTCY) \end{array} \right\} \quad (4)$$

In other words, the unit movement is decreased.

When rotation is to be effected, $\Delta x_E$ and $\Delta y_E$ are changed in the following way:

$$\left. \begin{array}{l} \Delta x_E = (\Delta xi)\cos\{\theta' + (SFTD)\} + (\Delta yi)\sin\{\theta' + (SFTD)\} \\ \Delta y_E = (\Delta xi)\sin\{\theta' + (SFTD)\} + (\Delta yi)\cos\{\theta' + (SFTD)\} \end{array} \right\} \quad (5)$$

where $\theta'$ represents the amount of rotation in the previous pitch and SFTD is the unit amount of rotation.

The abovementioned SHFTCX and SHFTCY are selected to be about 0.5 mm on the picture surface, for example, and SFTD, to be about 1.4.

It can be considered that the moving register 27 shown in FIG. 2 holds the abovementioned $\Delta x_E$ and $\Delta y_E$ in accordance with the movement indication.

Figure 4:
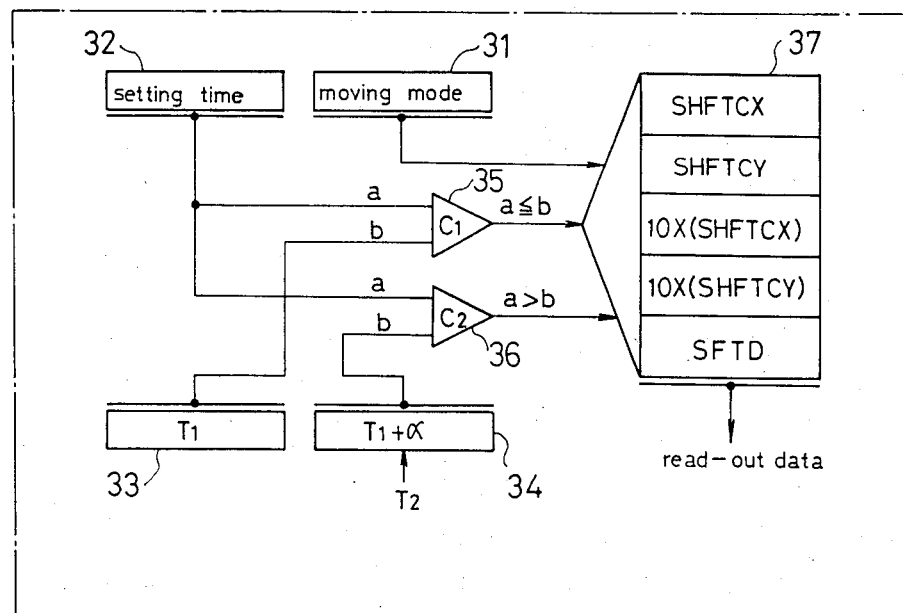
FIG. 4 is a diagram showing the construction of a linear motion and/or rotational motion register shown in FIG. 2.

FIG. 4 shows an example of the moving register. Reference numeral 31 in the drawing represents a moving mode data register which instructs any one of the desired locus changing movements on the X axis, the Y axis, and angle rotation. Reference numeral 32 represents a set time data register to which the time data for the movement indication are set. Reference numeral 33 represents a register which holds time data ($T_1$) and which provides the reference for checking the size of the contents of the register 32. Reference numeral 34 represents a register for holding time data ($T_1+\alpha$), to which a desired value $T_1$ is preset and the time data $T_2$ is added after passage of time $T_1$. Register 34 also provides the reference for checking the size of the contents of register 32 in the same way as register 33. Reference numerals 36 and 37 represent a comparison circuit and a memory for the amount of a unit movement, respectively.

Figure 5:
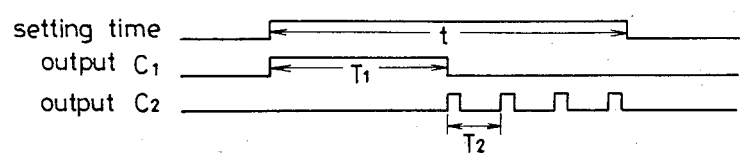
FIG. 5 is a diagram useful for explaining an example of setting the amount of movement.

It will be assumed, for example, that X coordinate motion is instructed to the register 31 and the time data t is set to the register 32 as shown in FIG. 5. In this case, since $$T_1 < t < T_1 + 4T_2,$$

fine adjustment and rough adjustment are effected once and four times for the X coordinates, respectively. In other words, the data SHFTCX for the fine adjustment is first read out from the memory 37 and the amount of movement of the following equation in accordance with equation (4) is applied to the convertor 19:

$$\Delta x_E = SHFTCX$$

Then, the amounts of movement of the following equations are sequentially applied to the convertor 19, which carries out the coordinate conversion processing in accordance with equation (2) whenever it receives each amount of movement:

$$\Delta x_E = (SHFTCX) + 10x(SHFTCX)$$

$$\Delta x_E = 11x(SHFTCX) + 10x(SHFTCX)$$

$$\Delta x_E = 21x(SHFTCX) + 10x(SHFTCX)$$

$$\Delta x_E = 31x(SHFTCX) + 10x(SHFTCS)$$

In other words, the driving orbit 6 is moved linearly in the X direction. The other movements can be done in the same way.

As described above, the present invention makes it possible to carry out locating the course locus relative to the map position easily and accurately by moving the driving locus 6 itself rather than the map with respect to the driving locus 6 when the map is reset or the like. (Needless to say, the present invention does not preclude the latter method).

What is claimed is:

1. In a course guidance system for a moving body which includes a direction sensor and a speed sensor mounted to the moving body, a display, a map displayed on said display, and a display information processing unit including position calculating means for periodically deriving the coordinates of the positions of the moving body relative to a predetermined reference position on said map based upon the outputs of said direction and speed sensors, a locus memory for sequentially storing locus data corresponding to the derived coordinates of positions traversed by the moving body from the reference position, and means including a locus display memory for storing and plotting a course locus corresponding to the locus data on the display in registration with said map, the improvement wherein said display information processing unit further comprises:

a keyboard for inputting linear displacement and rotation data to said processing unit indicative of a desired adjusting movement of the entire course locus on the display relative to said map;

means for setting the desired scale of the map input through said keyboard and means for selecting the locus data in said locus memory corresponding to the desired map scale; and means including a memory converter for converting the scale selected locus data from said locus memory in accordance with said linear displacement and rotation data and transferring the converted locus data to said locus display memory.

2. The course guidance system as defined in claim 1, further comprising a second memory converter for correcting the locus data from said locus memory in accordance with a deviation angle input through said keyboard corresponding to a deviation between an indicated locus orientation of the display and an actual orientation of the moving body.

3. The course guidance system of claim 1, wherein said locus data comprise X and Y coordinate components of the locus positions, and said memory converter includes means for adding individual offset quantities to said X and Y coordinate components in accordance with said linear displacement and rotation data.

4. The course guidance system of claim 1, wherein said position calculating means includes an angle converter for converting the output of said direction sensor into angle data, and X and Y component calculators for calculating X and Y coordinate component values in accordance with a sampling clock signal provided by said speed sensor.

5. The course guidance system as defined in claim 1 wherein said display consists of a cathode ray tube.

6. The course guidance system as defined in claim 1 wherein said map is placed on the display surface of said display and consists of a map printed on a transparent film.

7. The course guidance system as defined in claim 1 which further includes means for prohibiting said display during driving of said moving body based on suppress mode instruction data given by the keyboard operation and on the movement data from said speed sensor.

* * * * *

UNITED STATES PATENT AND TRADEMARK OFFICE
CERTIFICATE OF CORRECTION

PATENT NO. : 4,628,456

DATED : December 9, 1986

INVENTOR(S) : Itaro Hatano et al.

It is certified that error appears in the above-identified patent and that said Letters Patent is hereby corrected as shown below:

On the title page Assignee should read:

-- Alps Electric Co., Ltd. and
  Honda Motor Co., Ltd., Tokyo, Japan, part interest --.

Signed and Sealed this

First Day of September, 1987

Attest:

DONALD J. QUIGG

Attesting Officer

Commissioner of Patents and Trademarks